United States Patent
Olsson et al.

(10) Patent No.: US 6,845,105 B1
(45) Date of Patent: Jan. 18, 2005

(54) METHOD AND APPARATUS FOR MAINTAINING SEQUENCE NUMBERING IN HEADER COMPRESSED PACKETS

(75) Inventors: Gunnar Olsson, Tumba (SE); Simon Rahlén, Tullinge (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 815 days.

(21) Appl. No.: 09/670,720

(22) Filed: Sep. 28, 2000

(51) Int. Cl.$^7$ .................................................. H04J 3/16
(52) U.S. Cl. ................. 370/469; 370/235; 370/392; 370/412; 370/474; 370/521; 709/240
(58) Field of Search ................................. 370/216, 235, 370/389, 392, 412, 466, 471, 477, 428, 521, 349, 394, 474, 252, 469; 709/240

(56) References Cited

U.S. PATENT DOCUMENTS

| | | | | |
|---|---|---|---|---|
| 5,850,526 A | * | 12/1998 | Chou ............................ | 709/247 |
| 6,006,268 A | * | 12/1999 | Coile et al. .................. | 709/227 |
| 6,198,735 B1 | * | 3/2001 | Pazhyannur et al. ........ | 370/349 |
| 6,300,887 B1 | * | 10/2001 | Le ................................ | 341/60 |
| 6,414,950 B1 | * | 7/2002 | Rai et al. ..................... | 370/338 |
| 6,512,754 B2 | * | 1/2003 | Feder et al. ................. | 370/338 |
| 6,539,004 B1 | * | 3/2003 | Sawyer ........................ | 370/331 |
| 6,608,841 B1 | * | 8/2003 | Koodli ......................... | 370/474 |

* cited by examiner

Primary Examiner—Ricky Ngo
Assistant Examiner—Alan V. Nguyen

(57) ABSTRACT

A method and apparatus for maintaining a plurality of sequence numbers in a plurality of header compressed packets associated with an information context is described. Header compressed packets are transferred on a communication link according to a multi-layer protocol having at least a higher layer and a lower layer. If it is determined that one or more header compressed packets has been dropped, a flag is set on the header compressed packets. A sequence count at the higher layer and lower layer may be reduced by a number corresponding to the number of header compressed packets dropped. The sequence number of each of the header compressed packets is checked at the lower layer against the sequence count and renumbered to match the sequence count. If the sequence number and the sequence count match the flag is cleared. The higher layer is a PPP layer and the lower layer is a Physical Layer.

8 Claims, 4 Drawing Sheets

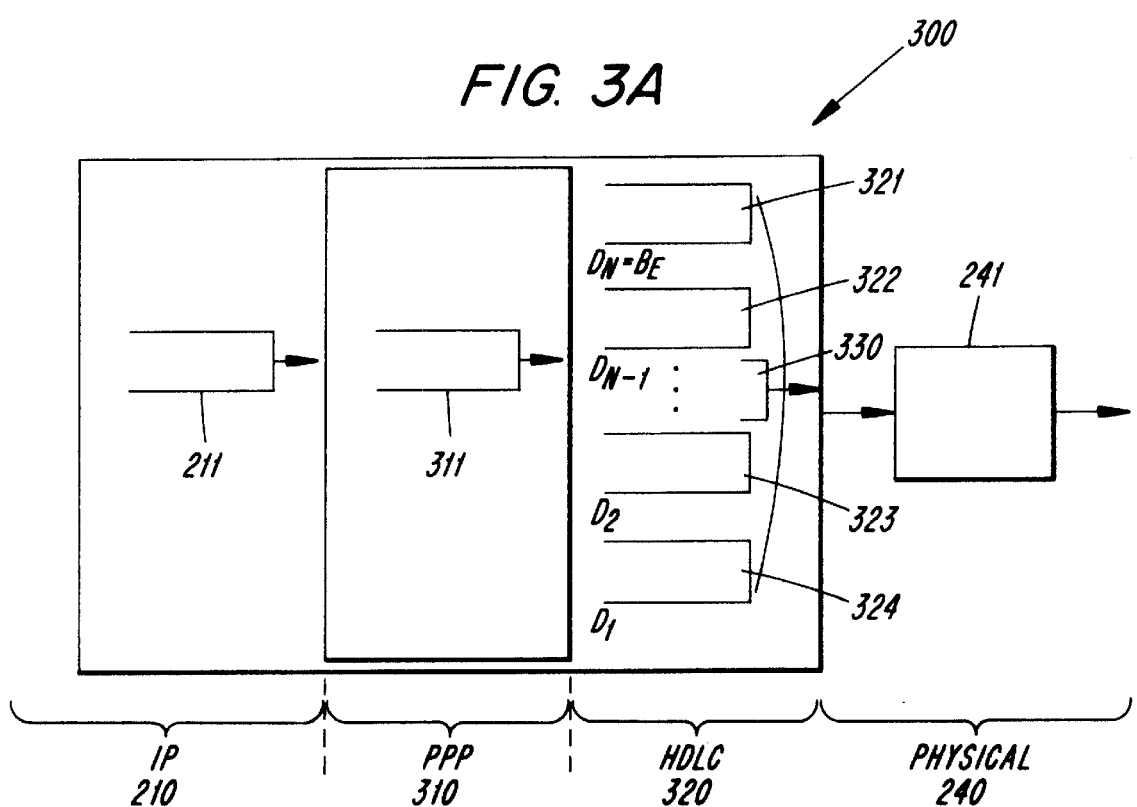
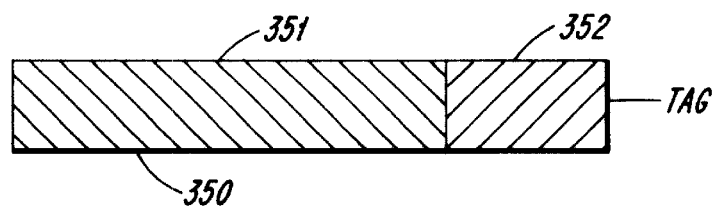
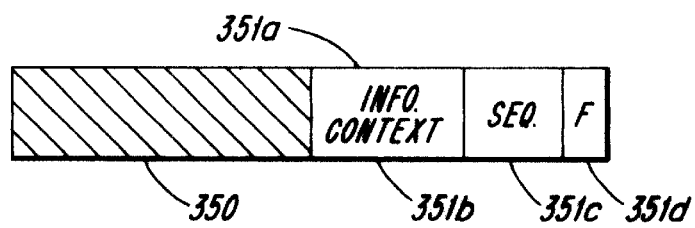

METHOD AND APPARATUS FOR MAINTAINING SEQUENCE NUMBERING IN HEADER COMPRESSED PACKETS

CROSS-REFERENCE TO RELATED APPLICATIONS

The present application is related to copending U.S. Pat. No. 6,577,596, entitled "METHOD AND APPARATUS FOR PACKET DELAY REDUCTION USING SCHEDULING AND HEADER COMPRESSION".

BACKGROUND

The present invention relates to multiplex communication systems for transferring information in packets and more particularly, to processing of address header information to perform sequencing of header compressed packets to ensure proper output sequence order of packets in a multilayered network architecture.

Modern communications networks carry increasing amounts of packet traffic which is associated with real-time voice, video, and related data. The Internet, for example, is seeing many new applications which take advantage of what is a relatively less costly alternative to conventional telephone call connections for sending a variety of data including real time voice and video. Trends toward real time applications over the Internet are driven in part by increasingly powerful computers being installed in private homes and the proliferation of the Internet as a focal point for various on-line activities such as holding voice conversations, listening to music, watching video clips, and the like. Unlike Internet communications which occur between computers on high bandwidth commercial connections, bandwidth in a typical home is limited by connectivity constraints imposed by modem speed, line quality, and the like.

Further compounding the basic problem of limited bandwidth, is the limitation on the amount of actual information transmitted as a result of packet overhead due to protocol headers. Basic Internet protocols were developed primarily for making sure that packets were delivered accurately end to end at a time when little consideration was paid to real time issues.

Three layer interface architectures including protocols such as X.25, for example, were developed for controlling transfer at the lower levels while higher layer protocols were developed to control more sophisticated functions (see, "Open Systems Interconnect (OSI)—New International Standards Architectures and Protocols for Distributed Information Systems," special issue, Proceedings of the IEEE, H. C. Folts and R. des Jardins, eds., vol. 71, no. 12, December 1983). According to the design philosophy, lower layer functions were contemplated to be "transparent" to higher layer functionality and thus much of what can be accomplished at the lower layers is limited only by the ability of lower layer hardware and software to preserve that transparency. At the lowest layer, the Physical Layer, a protocol specification governs the physical connection between devices, such as, for example, the X.21 protocol. Next, the Data Link Layer specifies the protocol for, for example, accepting packets from higher layers and placing them into, for example, HDLC frames for transfer across the Physical Layer. The Data Link layer further may accept framed information from the Physical Layer and unpack it for transfer up to the Network Layer. At the Network Layer, or packet layer, multiple logical connections may be established and addresses attached to packets based on several assumptions including that successful end to end delivery is not guaranteed, that orderly delivery is not guaranteed, and that packets or "datagrams" are delivered one at a time each containing information such as destination address, and the like.

It is important to note that while various lower layers are discussed herein, datagrams from higher layers may form the input to a Network Layer process or system, which in turn provide input to successively lower layers, and eventually to the destination. Higher layer datagrams input to a Network Layer entity may be input from, for example, a Transport Layer process or system. A typical and well know transport layer protocol is the Transport Control Protocol (TCP) although other Transport Layer protocols are known and used. In particular, the User Datagram Protocol (UDP) may often be used as a Transport Layer protocol. UDP is a protocol which defines a connectionless datagram service. A Transport Layer process or system implementing UDP may produce self-contained data packets which include destination routing information.

A ubiquitous protocol for Network Layer communications over the Internet is the Internet Protocol (IP). The IP specification includes an enumeration of fields associated with the IP header which fields contain information about an associated packet including information for determining how the packet should be delivered. The IP header fields will be described in greater detail herein below. For a more complete understanding of the contents of the IP header, see "Internet Protocol Specification", E. J. Postel, SRI International, Menlo Park, Calif., September 1981, RFC791.

For Data Link Layer communications, Point-to-Point-Protocol (PPP) has become a dominant protocol. PPP includes three main components: a method of encapsulating multi-protocol datagrams, a datagram being a unit of transmission in the network layer (such as IP), a link control protocol (LCP) for establishing, configuring and testing the data-link connection, and a family of network control protocols (NCP) for establishing and configuring different network-layer protocols.

PPP is designed to transport packets between two so-called peers, i.e. the two ends of a link conforming to the protocol. Accordingly, the LCP may be used to agree upon the encapsulation format options, handle varying limits on sizes of packets, detect configuration errors, and terminate the link. Other optional facilities are the authentication of the identity of its peer on the link, and the determination when a link is functioning properly and when it is failing. PPP links-provide full-duplex simultaneous bidirectional operation. A definition of PPP may be found in the Networking Group Request for Comments RFC 1661, "The Point to Point Protocol" editor W. Simpson, July 1994.

Communication across a link established using PPP is accomplished such that a datagram associated with a protocol may be encapsulated into one or more frames. A frame, as described above, may include a header and/or a trailer, along with some number of units of data. However, it is conventional that an entire packet is mapped into a frame. Conventional framing breaks down however during conditions of heavy network congestion where fragmentation methods may be used to improve flow control management. Congestion giving rise to latency may be a particular problem for real time data such as voice or video, VoIP, Telnet, and the like. Such real time data formats have little or no tolerance to packet latency, jitter, packet reordering and related problems. Problems associated with the multilink environment only amplify the unique real time packet data requirements.

To ease congestion, one solution known as Link Fragmentation and Interleaving (LFI) is proposed in the White Paper entitled "Cisco™ Software Quality of Service Solutions", Apr. 8, 1999, by Cisco Systems. In LFI, delay and jitter are reduced by breaking up large datagrams and interleaving time sensitive packets with the resulting packet fragments. LFI is contemplated for relatively low speed links where serialization delay is the predominant delay factor. LFI simply requires that PPP be configured to allow for interleaving. Otherwise, LFI is transparent to PPP.

Certain problems arise associated with conventional LFI and related data transfer which provide for PPP based scheduling and sequencing related primarily to delay waiting for, for example, long packets to be transferred. Such delay may create round trip delays associated with interactive real time data, such as a voice conversation, of close to a second. By, for example, fragmenting packets of various priorities larger than a predetermined size, high priority packets or fragments thereof may be sent between fragments of lower priority packets. Existing PPP specifications already provide for fragmentation by providing sequence numbers and begin and end bits in the PPP encapsulation format. However, existing PPP specifications do not provide for the suspension of transfer of fragments of one packet in order to send another, due to contiguous packet numbering schemes. Moreover, existing PPP specifications do not accomodate packet dropping which may occur at layers below PPP, for example, at the Physical Layer.

Regardless of the methods of scheduling fragments contemplated, problems arise in implementation. In particular, it should be noted that the lower three protocol layers and associated protocols including, for example, UDP, IP, and PPP, along with the physical layer typically reside on hardware resources, such as routers, which may introduce limitations that are detrimental to the benefits gained from fragmentation and other scheduling methods. In particular, a router, for example, may typically queue outbound packets together in the same transmit queue once priority or the like has been established. The configuration of a typical outbound packet queue is generally First In First Out (FIFO) and has a level of intrinsic delay associated with the queue depth. Further, a router experiencing high traffic levels and using a typical outbound packet queue raises the possibility of packet dropping when congestion occurs, even when using LFI, multi-link PPP or the like. If packets are forced to be dropped from downstream queues after IP or PPP scheduling occurs, problems related to packets received out of sequence may occur. Depending on the link configuration, request for retransmission of the missing packets, for example, may cause delay and degradation of real time data.

Packet dropping can be particularly troublesome when used in conjunction with other methods of reducing congestion such as, for example, header compression. By compressing or discarding certain portions of information contained in a typical header, header compression methods reduce the overall size of the datagram or packet. This is particularly important in the case of small packets typically used for real time data transfer applications where the header may represent close to 100% packet overhead. Although, header compression may be performed at various stages, problems arise due to an assumption which must be made in the art when using header compression that packet reordering or resequencing, including the effects of packet dropping, will not occur.

When a header-compressed (HC) packet is lost or discarded due to, for example, queue backup, the existence of a missing packet may typically be discovered at a decompressor. The decompressor located at a peer layer in a receiver node may signal back to a transmitter peer layer compressor to transmit, for example, a full header. Until a full header is received by the decompressor, all newly arrived packets will be discarded. Such an approach may function well as a protection against link errors, but such scenarios may be better managed by, for example, dealing with queue control at the transmitter and dealing with packet sequencing upstream at the scheduler if packets need to be dropped as further described in U. S. Pat. No. 6,577,596, supra. Thus, in accordance with one aspect of a HC based approach, a sequence number may be assigned during packet compression, i. e., in the PPP-layer, such that resulting packet dropping problems only affect operation at the PPP layer. Existing approaches however have drawbacks in that conventional approaches for dealing with packet dropping at the PPP layer add nearly as much header overhead as was saved originally with header compression techniques and do not address the problem of packet dropping at layers below PPP. For more general information on header compression see Internet Engineering Task Force (IETF), INTERNET DRAFT, "Providing Integrated Services Over Low-bitrate Links", June 1999, expires: December 1999, by Carsten Borman, and see also Networking Group Request for Comments RFC 1144, "Compressing TCP/IP Headers for Low-Speed Serial Links", editor V. Jacobson, February 1990.

Therefore, it would be appreciated in the art for a method and apparatus which reduces the adverse effects of packet dropping at the Physical Layer in header compression based packet communication systems.

SUMMARY

A method and apparatus for maintaining a plurality of sequence numbers in a plurality of header compressed packets associated with an information context is described. The information context may include, for example, a voice channel or a data channel. The plurality of header compressed packets may be destined to be transferred on a communication link according to a multi-layer protocol. As will be appreciated by those skilled in the art, a multi-layer protocol in accordance with exemplary embodiments of the present invention may have at least a higher layer, and a lower layer.

Therefore, in accordance with one aspect of the present invention, it may be determined that one or more of the plurality of header compressed packets associated with the information context has been dropped. Dropping may be due to congestion, or loss due to link errors and the like. Upon packet dropping, a flag may be set on the plurality of header compressed packets associated with the information context. While other information contexts may be present only those packets associated with the information context from which the packet was dropped may be flagged. A sequence count associated with the higher layer and the lower layer may accordingly be reduced by a number corresponding to the number of header compressed packets which were dropped.

In accordance with another embodiment of the present invention, the sequence number associated with each of the plurality of header compressed packets may be checked at the lower layer against the sequence count, e.g. prior to transmission. Based on the check, the the sequence number of each of the plurality of packets may be renumbered to match the sequence count which is kept at the lower and upper layers as described. If the sequence number and the sequence count match, the flag may be cleared. It should be noted that in one exemplary embodiment of the present invention, the higher layer may be a PPP layer although other protocols may be used. It should further be noted that the lower layer may be a Physical Layer and, as will be appreciated by those skilled in the art, various protocols are used which correspond to the Physical Layer in a multi-layer communication protocol.

BRIEF DESCRIPTION OF THE DRAWINGS

The objects and advantages of the invention will be understood by reading the following detailed description in conjunction with the drawings, in which:

FIG. 3A is a diagram illustrating exemplary IP scheduling at the HDLC layer;

FIG. 3B is a diagram illustrating an exemplary tag attached to a compressed header at the HDLC layer.

FIG. 3C is a diagram illustrating details associated with a data packet;

DETAILED DESCRIPTION

Therefore in accordance with the present invention a method and apparatus are provided which allow header compression to be used in conjunction with IP scheduling at various layers in a network node such as a router, line interface card, or the like.

Figure 1:
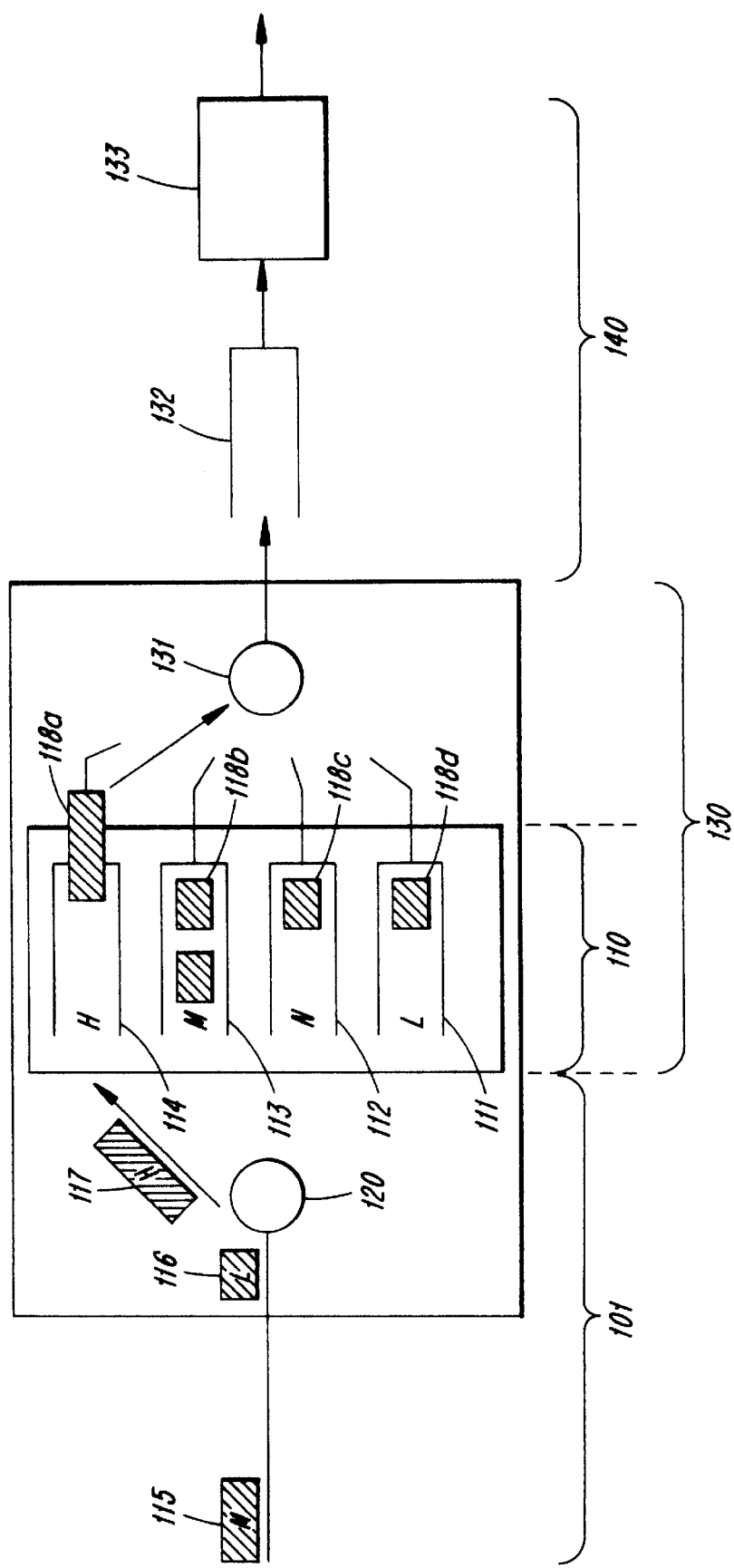
FIG. 1 is a diagram illustrating exemplary priority queuing.

As described in copending application entitled "METHOD AND APPARATUS FOR PACKET DELAY REDUCTION USING SCHEDULING AND HEADER COMPRESSION", supra, which is expressly incorporated by reference herein, an understanding of multilayer protocols allow problems associated with congestion control in links carrying multiple data types, (e.g real time, Best Efforts, and the like) which may be header compressed, to be better appreciated. Flow control related problems are particularly troublesome at layers below the layer which header compression occurred on especially when packets are scheduled at higher layers prior to header compression. Header compressed packets may be queued according to, for example, a conventional priority queuing scheme, an example of which is illustrated in FIG. 1, or may be queued according to a suitable derivative thereof. Exemplary network node 100 is shown having a priority queuing implementation with queues 111–114 ranging from Low to High priority respectively. Packets 115, 116, and 117, for example, arrive at network layer 101 with different priorities as may be determined by the contents of, for example, QoS information included with an IP header typically associated with each of packets 115, 116, and 117 respectively. High priority packet 117, for example, may be placed in high priority queue 114 by process 120. Incoming medium priority packet 115 and low priority packet 116 may be placed respectively in medium priority queue 113 and low priority queue 111 by process 120 when arriving at network layer 101. Priority queuing may take place at layer 110 which may be equivalent to data link layer 130 or an alternative protocol layer such as a PPP layer or the like which, for example, interfaces with or is embedded within data link layer 130. Outbound packets 118a–118d are sent to process 131 for queuing in transmit queue 132 according to priority with high priority outbound packet 118a being sent first as shown. Outbound packets 118a–118d may then be transferred to the physical layer by process 131 which may be a typical data link process such as HDLC or the like where they can be processed in FIFO transmit queue 132 and output to physical link 133.

While priority queuing described in conjunction with FIG. 1 may allow for packets to be processed more efficiently, it is important to note that efficient processing relies on accurate header information most often associated with, for example, an IP header for priority queuing and, for packets which have been fragmented, sequence information is crucial. At lower layers however, such information may not be as readily available and in the case of compressed IP headers, such information is unavailable until the IP packet is decompressed. For example, in configurations where fragmentation is used, lower layers may require additional header information to track fragments from peer to peer. It should be noted that in a layered protocol it is possible to have fragmentation at multiple layers, however each layer must track fragmentation and certain data types may not tolerate certain anomalies which are more probable when packets are fragmented such as out of sequence packets and the like. It should further be noted that at the lowest possible layer, maintaining sequencing may be particularly challenging as the "intelligence" of the layer diminishes as the actual physical transmission medium is approached.

It will further be appreciated that various QoS levels may be specified in an IP header of a datagram bound for an IP peer layer and such QoS levels may be handled by performing "pure" IP scheduling. A queuing discipline may be invoked using various queues for handling packets of varying time sensitivity. A low time sensitivity queue may carry packets with long delay tolerance. It may be possible for such time sensitivity to be determined, for example, by examining the DS byte or ToS field associated with the typical IP header. Packets with lower QoS requirements, for example, may be relegated to lower priority queues. In contrast, packets with higher levels of QoS, such as real time packets associated with, for example voice data, may be associated with higher levels of time sensitivity and may accordingly be placed in higher priority queues. Packets with progressively greater degrees of time sensitivity may be scheduled in progressively higher priority queues with the highest sensitivity packets being scheduled to a high time sensitivity queue. Packets having QoS set to Best Efforts, which are usually packets associated with non-real time data may be placed in a separate Best Efforts queue which, as the name suggests, are sent when possible, for example, during intervals when there are no higher priority packets to be sent.

Figure 2:
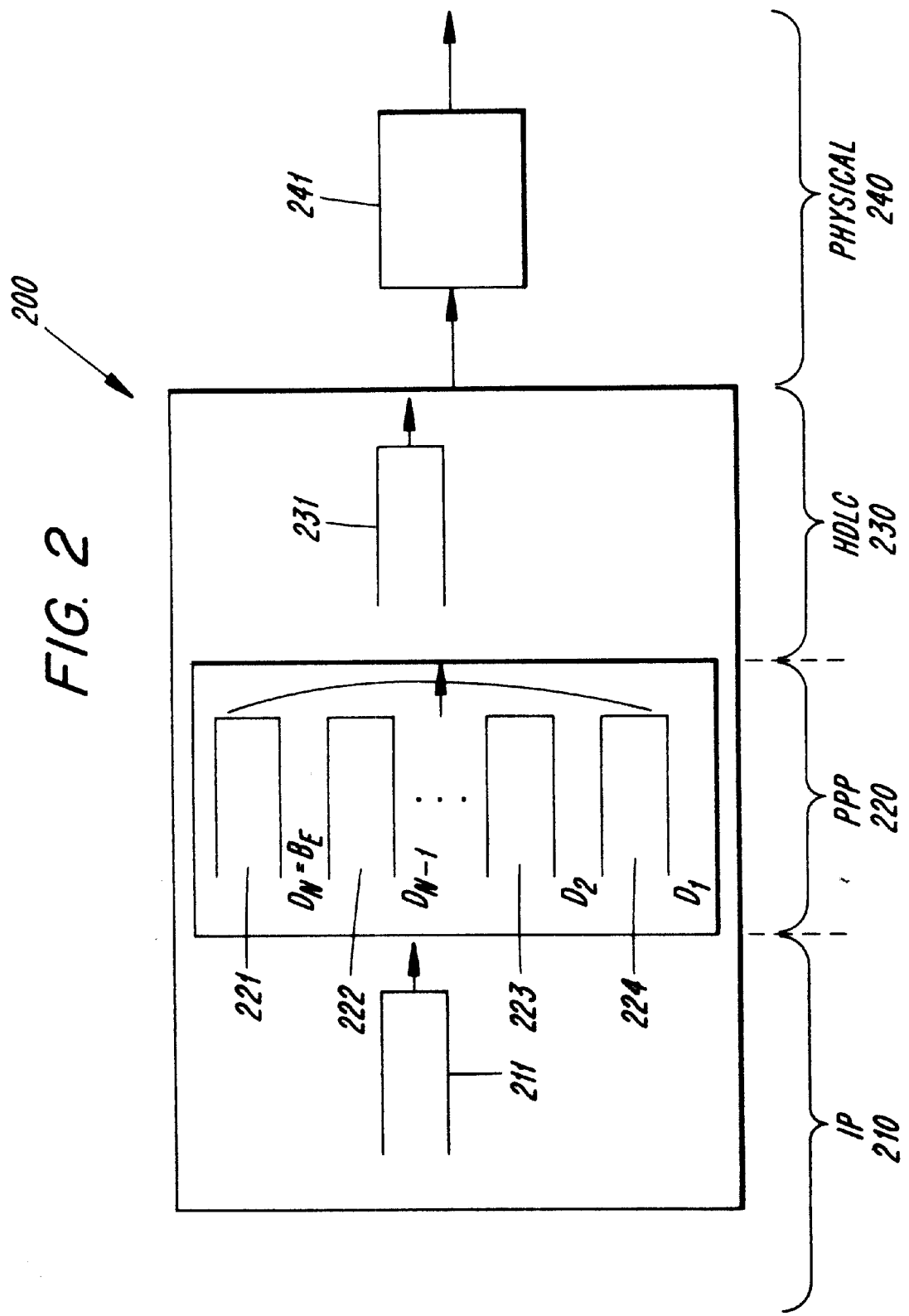
FIG. 2 is a diagram illustrating exemplary IP scheduling at the PPP layer.

It is possible in accordance with exemplary embodiments of the present invention to include packet scheduling at the PPP layer as is illustrated in FIG. 2 because of the reduction from two step scheduler to a one step scheduler. PPP layer 220 may be provided with a series of priority queues 221–224 representing varying degrees of time sensitivity from highest time sensitivity queue $D_1$ 224 to lower time sensitivity queue $D_{N-1}$ 222, to Best Efforts queue $D_N$ 221.

It is important to note that in each of the exemplary embodiments as described herein above, output processing must be performed including IP forwarding; Packet Identification (DS byte lookup); Packet Scheduling including packet discarding, rate control, and priority queuing; Header Compression; Link Adaptation including PPP/MP, Ethernet, ATM; and Link Framing. IP forwarding and identification must be done before Header Compression. It is further important to note that packet discarding must take place before HC, since, as described, a dropped packet in a header compressed sequence will cause out of sequence related problems.

In accordance with various exemplary embodiments of the present invention as illustrated in FIG. 2, scheduling may be performed at PPP layer 220. Incoming packets at IP layer 210 may be may be analyzed for priority or classification levels. PPP layer 220 may check the depth of the queue associated with a particulary priority or classification prior to scheduling. If the queue associated with the priority or classification of the packet is full, the packet may be discarded by the scheduling process at PPP layer 220. If the queue associated with the priority or classification is not full header compression may be performed, a PPP header added, and further segmentation may be performed using MP, as described, if needed, before queuing the packet, for example in output queue 231 for transfer to physical layer 241.

In yet another exemplary embodiment of the present invention HDLC scheduling may be performed at, for example, HDLC layer 320 as illustrated in FIG. 3A to reduce maximum waiting time for a high priority packet. HDLC layer 320, as in PPP layer 220 of FIG. 2, may be provided with a series of priority queues 321–324 representing, for example, varying degrees of time sensitivity from highest time sensitivity queue $D_1$ 324 to lower time sensitivity queue $D_{N-1}$ 322, to Best Efforts queue $D_N$ 321. It should be noted that output buffer 330 may in some embodiments be set to a depth of one packet so as to apply "backpressure", e.g. forcing any packet discarding to occur at higher layers, however packets at this layer may nonetheless be dropped due to time constraints imposed by congestion or the like, or if the depth of output buffer 330 is not able to be controlled. For scheduling at HDLC layer 320, generating an interrupt from output buffer 330 to improve packet latency for time sensitive packets, for example, voice packets while maintaining full link utilization may not be an optimum solution since scheduling may now be performed, for example, on an interface card. Instead of one buffer at HDLC layer 320 there will be buffers 321 through 324 using, for example, a scheduling algorithm similar to that used for scheduling at the PPP layer 220 previously described with reference to FIG. 2. Accordingly, no back pressure and no scheduling at IP layer 210 and PPP layer 310 is needed. To handle discarding, it may be preferable to implement signaling between a discarding process and a scheduling process at HDLC layer 320. It should be noted again that a problem occurs when header compression is performed on IP packets, due to classification information contained, for example, in the DS byte, being unavailable after compression along with the possibility of packet dropping at the Physical Layer.

Accordingly, in the present embodiment as illustrated in FIG. 3B, a local byte or "tag" 352 may be added on top of packet 351, preferably now header compressed, by the scheduling process at HDLC layer 320 below PPP layer 310. Tag 352 may contain information which is redundant to the information contained in the header and is created prior to compression. Tag 352 may be removed before packet 351 is queued for transmission. Discarding of packets may be performed separately from the rate control at a point before header compression. Rate control may be performed within the scheduling process at HDLC layer 320. The decision as to whether a packet should be discarded or not may preferably be based on a check performed after receiving an IP packet from, for example, buffer 311 in PPP layer 310. If the corresponding one of queues 321–324 the packet is destined for is full, the packet will be dropped, else it will proceed to header compression. Alternatively, in accordance with another exemplary embodiment of the present invention as will be described in greater detail hereinafter, and as illustrated in FIG. 3C, sequence number 351c associated with data portion 351a and information context 351b of packet 351 may be separately updated if packets are discarded. It should be noted that information context 351c may correspond to data associated with, for example, a particular voice conversation, data session, or the like. Flag 351d may be set in accordance with the present invention, for example, when it is detected that one or more packets have been dropped. Setting and clearing flag 351d is described in greater detail herein below with regard to FIGS. 4A and 4B.

Figure 4A:
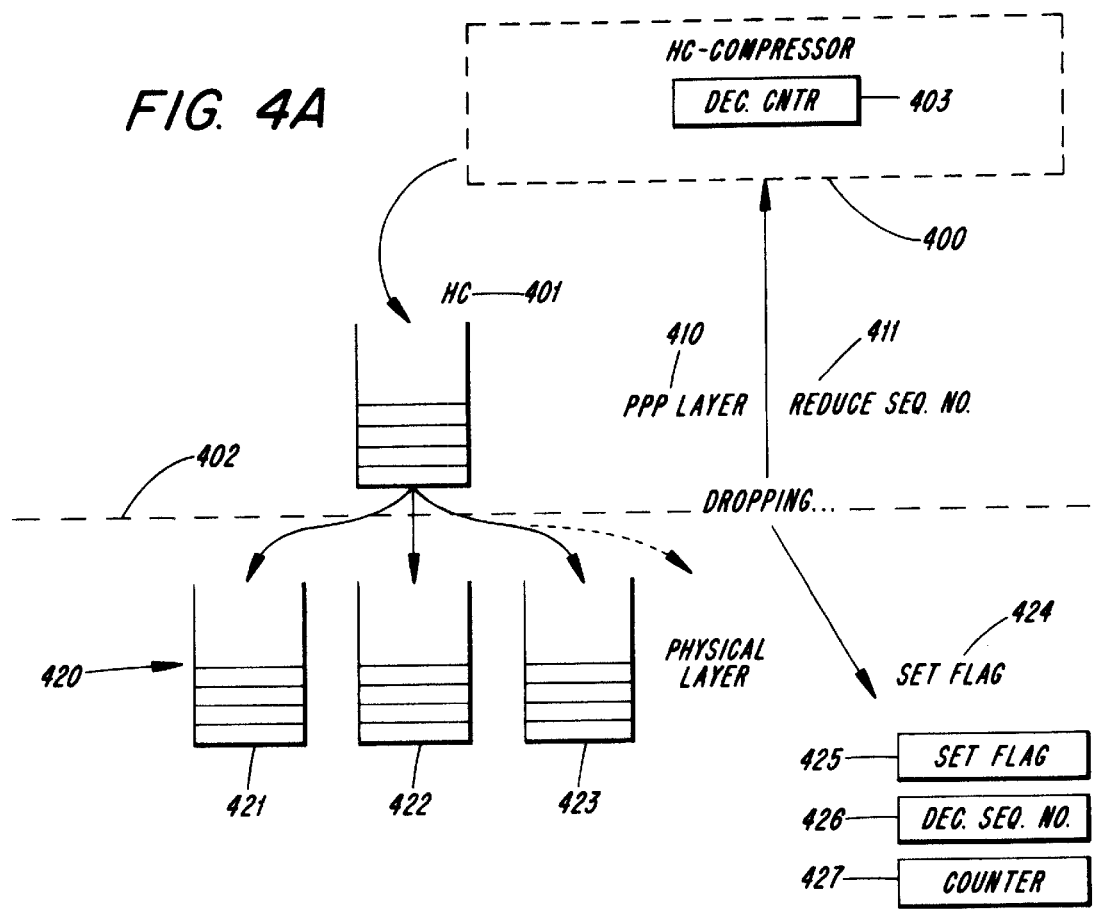
FIG. 4A is a diagram illustrating an exemplary PPP and Physical Layer configuration in accordance with the present invention.

Accordingly, as illustrated in FIG. 4A, an exemplary embodiment of the present invention may include detecting that a packet is being dropped, and signaling, e.g. sending signal 411, to HC-compressor 400 to reduce the sequence-number for all consecutive packets in an information context which has lost a packet, prior to queuing, for example, in queue 401. It should be noted that in the present exemplary embodiment, HC-compressor 400 is illustrated as being included in or above PPP Layer 410 or at least above interface 402 between PPP Layer 410 and Physical Layer 420. It should further be noted that, as will be appreciated by those skilled in the art, HC-compressor 400 may be implemented in a processor either as software executing on a processor or as a hardware processor configured to carry out such steps as may be necessary to perform compression functions and additional functions in accordance with the present invention. While HC-compressor 400 is, in accordance with the present invention, preferably implemented at a PPP layer 410, it could be implemented in a corresponding layer in an architecture which uses a protocol other than PPP, for example. In addition to sending signal 411, a set flag signal 424 may be sent to Physical Layer 420 prompting Physcial Layer 420 to set flag 351d and check all packets, for example, in queues 421–423, and decrease sequence number 351c associated with every packet 351 belonging to information context 351b, from which a packet has been lost or discarded. Thus function 403, for example, may be required at PPP-layer 410, for reducing sequence number counter for packets bound for compression in HC-compressor 400. While function 403 is illustrated as being within HC-compressor 400, it will be appreciated by those skilled in the art that function 403 could be implemented elsewhere, including in a software or hardware implementation without departing from the scope of the invention.

It should further be noted that in accordance with the present embodiment, two additional functions may be required in Physical Layer 420 on a per packet basis. Function 425 may set a flag when a packet is dropped and function 426 may change sequence number within the HC-headers of packets queued within Physical Layer 420 which are part of the information context associated with the dropped packet. It should further be noted that counter 427 may further be required to compare with sequence numbers within flagged packets. When a packet sequence number and the contents of counter 427 match the flag of the associated packet may be cleared. Although a small amount of additional processing may be required for each packet, e.g. to check the flag and, if necessary, change the sequence number, a large amount of processing is avoided such as when a packet is dropped and changing all affected packets in, for example, queues 421–423 at once.

It will further be appreciated that a sequence number in a HC-header may be tracked when putting a packet in priority queues 421–423, by keeping counters including, for example, "sequence number for next packet" for each priority queues 421–423, in Physical Layer 420. Accordingly, sequence number 351c from PPP Layer 410 may be overridden, and may therefore be removed. Since sequence number 351c is only used to accomplish peer to peer packet transfer over the link, the layer at which it is set, or the fact that it is overridden at a lower layer is not critical. Sequence number 351c has nothing to do, for example, with information contained in the rest of the header, other information contexts, or other functions associated with PPP Layer 420 where it is set, so communication to PPP Layer 420 regarding any overriding or "outsourcing" of numbering of sequence number 351c may be viewed as unnecessary. It should be noted that one of the only dependencies created by sequence numbering is the relationship sequence numbering creates between packets within the same information context, therefore the corresponding counters associated with renumbering are placed in Physical Layer 420 where renumbering is like to occur in accordance with the present invention.

Figure 4B:
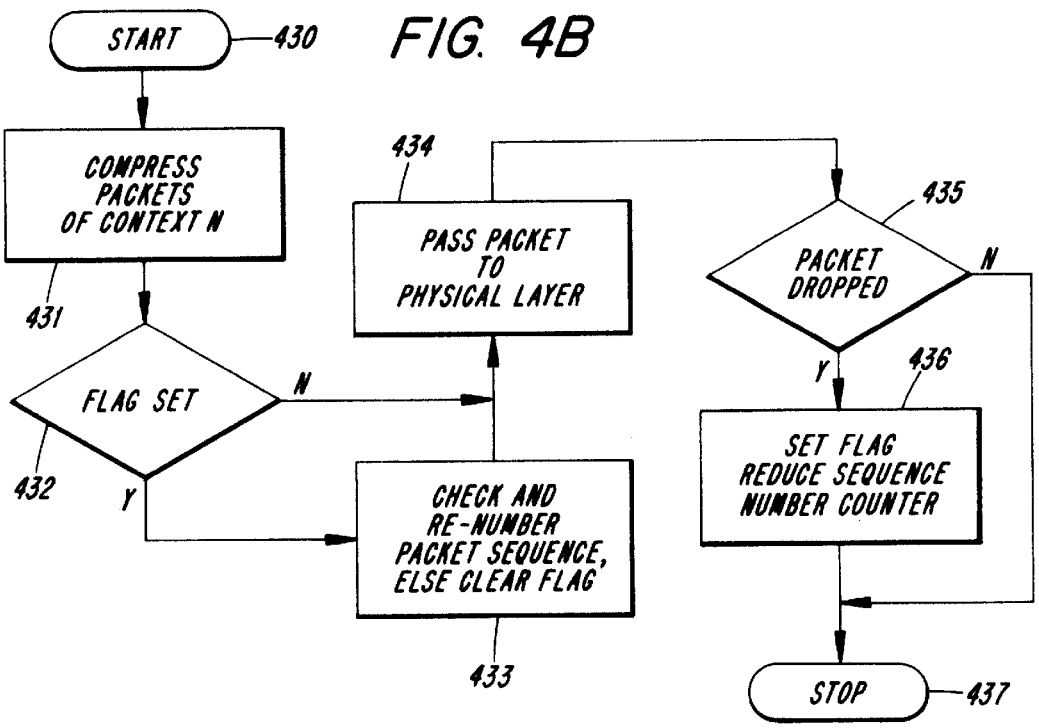
FIG. 4B is a flowchart illustrating exemplary steps in accordance with the present invention.

To better appreciate the above described exemplary embodiments, FIG. 4B is a flowchart where various steps in accordance with the present invention are illustrated. At start 430, it can be assumed that packet transfer is proceeding accordingly in that packets associated with, for example, information context "N" are being compressed at step 431 and passed to Physical Layer 420. At step 432, Physical Layer 420 may check to see if a flag is set associated with a queued packet. If a flag is set, the packet sequence numbering is checked and, if necessary renumbered in accordance with the description provided above. Otherwise, where the packet is not flagged the packet proceed normally through Physical Layer 420 along with other packets from its associated information context. Step 435 monitors for a packet drop at Physical Layer 420. If a packet is dropped, flags may be set for the associated information context and the sequence number changed accordingly. In addition, as described herein above a counter may be maintained at Physical Layer 420 to compare the sequence number of packets to the counter and if matching, the flag may be cleared as in step 433.

It should be noted that while Physical Layer 420 is described in a general manner herein which is intended to apply to a wide array of physical layer interfaces in which the invention may be practiced, it will be appreciated by those skilled in the art that Physical Layer 420 could be, for example, any one of a number of specific implementations of a physical layer in accordance with the present invention such as for example an appropriate protocol embodied in hardware such as, for example, an Ethernet Adapter, 10BaseT network interface, and the like.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

What is claimed is:

1. A method for maintaining a plurality of sequence numbers in a plurality of header compressed packets associated with an information context and transferred on a communication link according to a multi-layer protocol having at least a higher layer, and a lower layer the method comprising:

checking a sequence number associated with each of the plurality of header compressed packets at the lower layer against the sequence count;

renumbering the sequence number of the each to match the sequence count; clearing the flag if the sequence number and the sequence count match;

determining that one or more of the plurality of header compressed packets associated with the information context has been dropped;

setting a flag on the plurality of header compressed packets associated with the information context; and reducing a sequence count associated with the higher layer and the lower layer by a number corresponding to the one or more of the plurality of header compressed packets dropped.

2. The method of claim 1, wherein the higher layer is a PPP layer.

3. The method of claim 1, wherein the lower layer is a Physical Layer.

4. The method of claim 1, wherein the lower layer is an Ethernet layer.

5. An apparatus for maintaining a plurality of sequence numbers in a plurality of header compressed packets associated with an information context the apparatus comprising:

a communications link; and an interface device coupled to the communications link, the interface device for implementing the multilayer protocol having at least a higher layer, and a lower layer, the interface device having a processor, the processor configured to:

check a sequence number associated with each of the plurality of header compressed packets at the lower layer against the sequence count;

renumber the sequence number of the each to match the sequence count;

clear the flag if the sequence number and the sequence count match;

determine that one or more of the plurality of header compressed packets associated with the information context has been dropped;

set a flag on the plurality of header compressed packets associated with the information context; and reduce a sequence count associated with the higher layer and the lower layer by a number corresponding to the one or more of the plurality of header compressed packets dropped.

6. The apparatus of claim 5, wherein the higher layer is a PPP layer.

7. The apparatus of claim 5, wherein the lower layer is a Physical Layer.

8. The apparatus of claim 5, wherein the lower layer is an Ethernet Layer.

* * * * *